US010239624B2

(12) United States Patent
Behrens et al.

(10) Patent No.: US 10,239,624 B2
(45) Date of Patent: Mar. 26, 2019

(54) REVERSE AIR CYCLE MACHINE (RACM) THERMAL MANAGEMENT SYSTEMS AND METHODS

(71) Applicant: THE BOEING COMPANY, Chicago, IL (US)

(72) Inventors: William Webster Behrens, St. Louis, MO (US); Andrew Richard Tucker, Glendale, MO (US)

(73) Assignee: The Boeing Company, Chicago, IL (US)

( * ) Notice: Subject to any disclaimer, the term of this patent is extended or adjusted under 35 U.S.C. 154(b) by 134 days.

(21) Appl. No.: 15/433,681

(22) Filed: Feb. 15, 2017

(65) Prior Publication Data

US 2018/0229849 A1    Aug. 16, 2018

(51) Int. Cl.
*F02C 6/08* (2006.01)
*B64D 13/06* (2006.01)

(52) U.S. Cl.
CPC .............. *B64D 13/06* (2013.01); *F02C 6/08* (2013.01); *B64D 2013/064* (2013.01); *B64D 2013/0614* (2013.01); *B64D 2013/0674* (2013.01); *Y02T 50/44* (2013.01)

(58) Field of Classification Search
CPC ............ B64D 13/06; B64D 2013/0674; B64D 2013/0614; B64D 2013/064; F02C 6/08
See application file for complete search history.

(56) References Cited

U.S. PATENT DOCUMENTS

| | | |
|---|---|---|
| 5,899,085 A | 5/1999 | Williams |
| 7,849,702 B2 | 12/2010 | Parikh |
| 8,967,528 B2 | 3/2015 | Mackin |
| 9,114,881 B2 | 8/2015 | Mar |
| 2012/0000205 A1 | 1/2012 | Coffinberry |
| 2013/0111917 A1 | 5/2013 | Ho |

FOREIGN PATENT DOCUMENTS

| | | |
|---|---|---|
| CN | 1138685 | 12/1996 |
| WO | WO 2012/125895 | 9/2012 |
| WO | WO 2014/051678 | 4/2014 |

OTHER PUBLICATIONS

Extended European Search Report for EP 17210093.5-1010, dated Jul. 6, 2018.

*Primary Examiner* — Ana M Vazquez
(74) *Attorney, Agent, or Firm* — Joseph M. Butscher; The Small Patent Law Group, LLC

(57) ABSTRACT

An aircraft includes a thermal management system that is configured to cool portions of the aircraft. The thermal management system includes at least one reverse air cycle machine (RACM) mounted on an engine of the aircraft, and a vapor cycle system (VCS) that is configured to cool the portions of the aircraft. The VCS circulates a refrigerant therethrough. A condenser couples the RACM(s) to the VCS. The RACM(s) coupled to the condenser provides a heat sink for the VCS.

26 Claims, 6 Drawing Sheets

REVERSE AIR CYCLE MACHINE (RACM) THERMAL MANAGEMENT SYSTEMS AND METHODS

FIELD OF THE DISCLOSURE

Embodiments of the present disclosure generally relate to thermal management systems and methods, and, more particularly, to a thermal management system including a cascaded double flow reverse air cycle machine mounted to an engine of an aircraft.

BACKGROUND OF THE DISCLOSURE

Next generation military aircraft will require thermal management of much higher loads with minimal aircraft performance penalties. Such aircraft may include a thermal management system that incorporates a vapor cycle system (VCS). However, a VCS typically requires a low temperature heat sink for waste heat rejection.

Heat sinks that are typically available for rejecting waste heat include ram air, engine fan air and third stream air. A VCS can reject waste heat directly to ram air, but the accompanying increase in ram drag significantly degrades aircraft performance. Directly rejecting VCS waste heat to the engine fan air or third stream air is generally not a viable option because the temperature of these air streams is too high.

An air cycle machine can be used to generate a low temperature heat sink for a VCS. The air cycle machine would receive VCS waste heat via a refrigerant condenser and then transfer the water heat to either the engine fan air or third stream air. However, using air cycle machine for generating a VCS sink is extremely inefficient, resulting in a significant degradation in aircraft performance.

SUMMARY OF THE DISCLOSURE

A need exists for a thermal management system that is able to thermally control higher future military aircraft loads while minimizing aircraft performance penalties.

With that need in mind, certain embodiments of the present disclosure provide a thermal management system that is configured to cool portions of an aircraft. The thermal management system includes at least one reverse air cycle machine (RACM) mounted on an engine of the aircraft, a vapor cycle system (VCS) that is configured to circulate a refrigerant, and a condenser that couples the RACM(s) to the VCS. The RACM(s) coupled to the VCS through the condenser provides a first heat sink for the VCS.

In at least one embodiment, the RACM(s) receives compressed bleed air from an engine compressor and cools and expands the bleed air. The cooled and expanded bleed air is directed to the condenser where the expanded bleed air absorbs heat energy from the refrigerant that circulates through the VCS. The RACM(s) reintroduces the bleed air back into the engine after the bleed air passes through the RACM(s) to regain thrust.

In at least one embodiment, the engine includes a bypass heat exchanger within an engine case that is outside of an engine core. The RACM(s) is coupled to the engine compressor through the bypass heat exchanger. The bypass heat exchanger is disposed within a bypass air stream outside of the engine core. The bypass heat exchanger cools compressed bleed air from the engine compressor before the compressed air is directed to the at least one RACM.

In at least one embodiment, the bypass heat exchanger is disposed within one or both of a second air stream or a third stream outside of a first air stream that passes through the engine core.

In at least one embodiment, the RACM includes one or more turbines that are configured to expand and cool compressed bleed air from the compressor. The RACM includes one or more compressors that are configured to compress the bleed air after the bleed air passes through the first heat exchanger.

In at least one embodiment, the RACM includes a first turbine, a second turbine, a first compressor, and a second compressor. The first turbine, the second turbine, the first compressor, and the second compressor are coupled to a common shaft.

The thermal management system may also include a second heat exchanger coupled to a fuel line and the VCS. The second heat exchanger coupled to the fuel line provides a second heat sink for the VCS. A third heat exchanger may be coupled to a ram air bypass conduit and the VCS. The third heat exchanger coupled to the ram air bypass conduit provides a third heat sink for the VCS.

In at least one embodiment, the at least one RACM includes a low pressure RACM coupled to a high pressure RACM.

The thermal management system may also include a control unit operatively coupled to the low pressure RACM and the high pressure RACM. The control unit is configured to direct compressed bleed air from an engine compressor through only the low pressure RACM when an airspeed of the aircraft is subsonic. The control unit is configured to direct the compressed bleed air from the engine compressor through the high pressure RACM before the low pressure RACM when the airspeed of the aircraft is supersonic. The control unit may be in communication with a plurality of valves that are selectively controlled to selectively direct the compressed bleed air through the low pressure RACM and the high pressure RACM.

In at least one embodiment, the low pressure RACM includes a first turbine and a second turbine coupled to a first compressor and a second compressor through a first shaft. The high pressure RACM includes a third turbine coupled to a third compressor and a fourth compressor through a second shaft.

In at least one embodiment, a first RACM is mounted on the engine and a second RACM is mounted on the engine. One or both of the first RACM or the second RACM may include a low pressure RACM coupled to a high pressure RACM.

Certain embodiments of the present disclosure provide a method of cooling portions of an aircraft that includes a fuselage defining an internal cabin, wings extending from the fuselage, and an engine carried by the fuselage. The engine includes an engine case containing an engine fan and an engine core including an engine compressor. The method includes mounting at least one reverse air cycle machine (RACM) on the engine of the aircraft, using a vapor cycle system (VCS) to circulate a fluid therethrough to cool the portions of the aircraft through heat exchange, coupling the at least one RACM to the VCS through a condenser, and providing a first heat sink for the VCS through the coupling the at least one RACM to the VCS.

Certain embodiments of the present disclosure provide an aircraft that includes a fuselage defining an internal cabin, wings extending from the fuselage, and an engine carried by the fuselage. The engine includes an engine case containing an engine fan, an engine core including an engine compressor, and a bypass heat exchanger within the engine case that is outside of the engine core. The bypass heat exchanger is disposed within a bypass air stream outside of the engine core. The aircraft also includes a thermal management system that is configured to cool portions of the aircraft.

DETAILED DESCRIPTION OF THE DISCLOSURE

Figure 1:
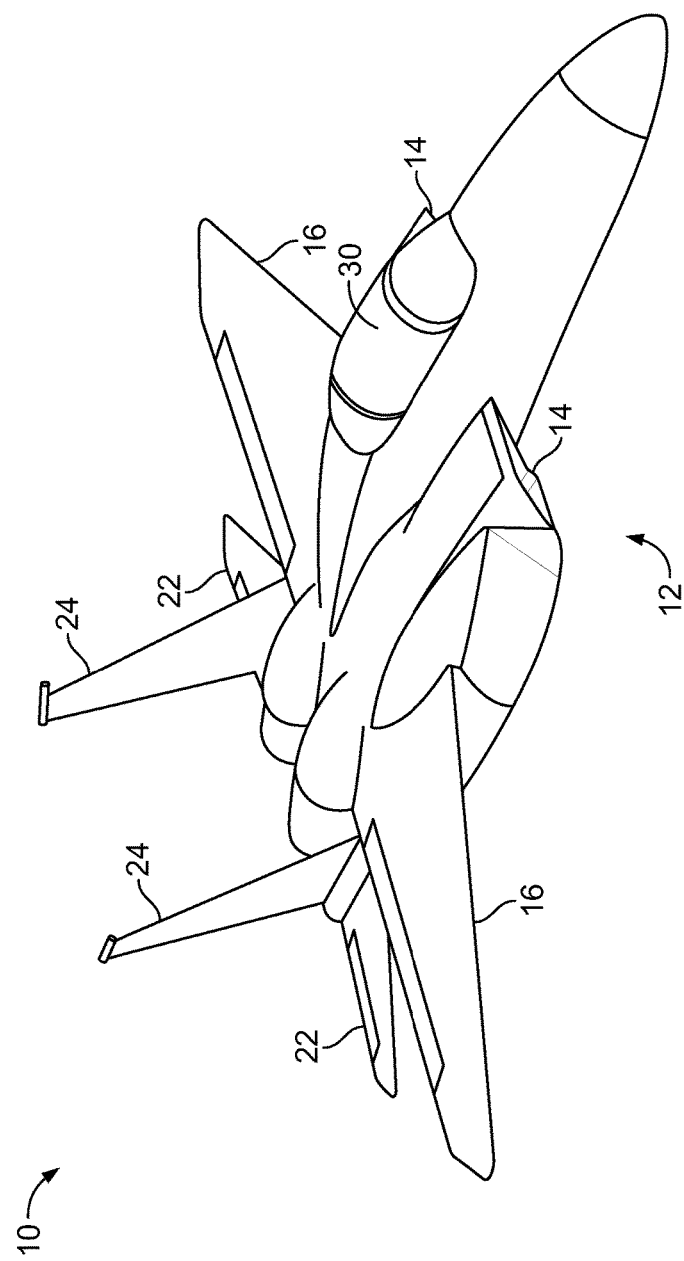
FIG. 1 illustrates a perspective front view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a thermal management system for an aircraft. In at least one embodiment, the thermal management system includes a cascaded double flow reverse air cycle machine (RACM) mounted to the engine. The RACM is configured to generate a low temperature heat sink for a core vapor cycle system (VCS). The RACM reintroduces heat sink air into the engine upstream of the engine fan to recover thrust, reducing the penalty associated with engine bleed extraction. Double flow refers to using parallel turbines and compressors to minimize the size of the RACM. Multiple RACMs can be mounted to an engine to further minimize the size of the RACM unit.

Certain embodiments of the present disclosure provide a thermal management system that includes a reverse air cycle machine (RACM) or RACM unit directly mounted onto an engine of an aircraft. In at least one embodiment, multiple RACMs are mounted to the engine. The engine mounted RACM provides a low temperature heat sink for a thermal management system of an aircraft.

In at least one embodiment, the RACMs are mounted directly on the engine. Engine compressor bleed air enters the RACM and is expanded through one or more turbines. A temperature of the air is reduced due to expansion of the air, thereby allowing a vapor cycle system (VCS) to directly use the low temperature air as a heat sink. A thrust penalty due to engine bleed air extraction is minimized, or otherwise reduced by compressing the expanded air and reintroducing back it into the engine. Accordingly, all engine air utilized as a heat sink remains in the engine and generates thrust. A motor may be incorporated into the RACM to ensure adequate expansion and compression of the engine air occurs at all flight conditions. To reduce the size and weight of the RACMs, double flow RACMs may be used. In at least one embodiment, the RACMs are mounted on the sides of the engine, rather than on the top or bottom, which simplifies integrating the RACMs onto the engine and into the aircraft.

During super-sonic cruise, ram air may not provide a viable heat sink as its temperature is too high for adequate VCS heat rejection. Further, inter-stage second stream bleed and third stream air temperatures may also be so high that they cannot be adequately cooled by a RACM for use in VCS heat rejection. In this case, certain embodiments of the present disclosure provide cooling for engine compressor final stage bleed air via an engine duct air-heat exchanger and then send it to a cascaded RACM unit. The cascaded RACM unit includes a high-pressure three wheel RACM that is used to expand the cooled final stage bleed air and reduce its pressure and temperature before sending it into a low pressure four wheel RACM and that can further expand it and reduces its pressure and temperature. The resulting low temperature heat sink takes on waste heat from a VCS prior to being compressed first in the low pressure four wheel RACM and then in the high pressure three wheel RACM. This recompressed air is finally injected into the engine fan air stream. The three wheel RACM can be bypassed during ground idle, and sub-sonic cruise, and included during super-sonic cruise.

FIG. 1 illustrates a perspective front view of an aircraft 10, according to an embodiment of the present disclosure. As shown, the aircraft 10 is a military fighter jet. The aircraft 10 includes a propulsion system 12 that includes two engines 14, for example. Optionally, the propulsion system 12 may include more or less engines 14 than shown. The engines 14 are carried by wings 16 and/or a fuselage 18 of the aircraft 10. In other embodiments, the engines 14 may be carried by other portions of the aircraft 10. The fuselage 18 also supports horizontal stabilizers 22 and vertical stabilizers 24. The fuselage 18 of the aircraft 10 defines an internal cabin including a cockpit 30 and one or more equipment bays containing avionic to be cooled. Optionally, the aircraft 10 may be various other types of military aircraft. Alternatively, the aircraft may be various types of commercial aircraft.

As explained below, the aircraft 10 includes a thermal management system that is used to cool various systems within the aircraft, as well as the internal cabin. The thermal management system may include at least one vapor cycle system (VCS) coupled to at least one reverse air cycle machine (RACM). The RACM nay be a single flow RACM (including a single turbine and a single compressor), or a double flow RACM (including two turbines and two compressors). In at least one embodiment, the double flow RACM includes two turbines and two compressors coupled to a common shaft. The double flow RACM may include a motor. In at least one other embodiment, the double flow RACM may not include a motor.

Figure 2:
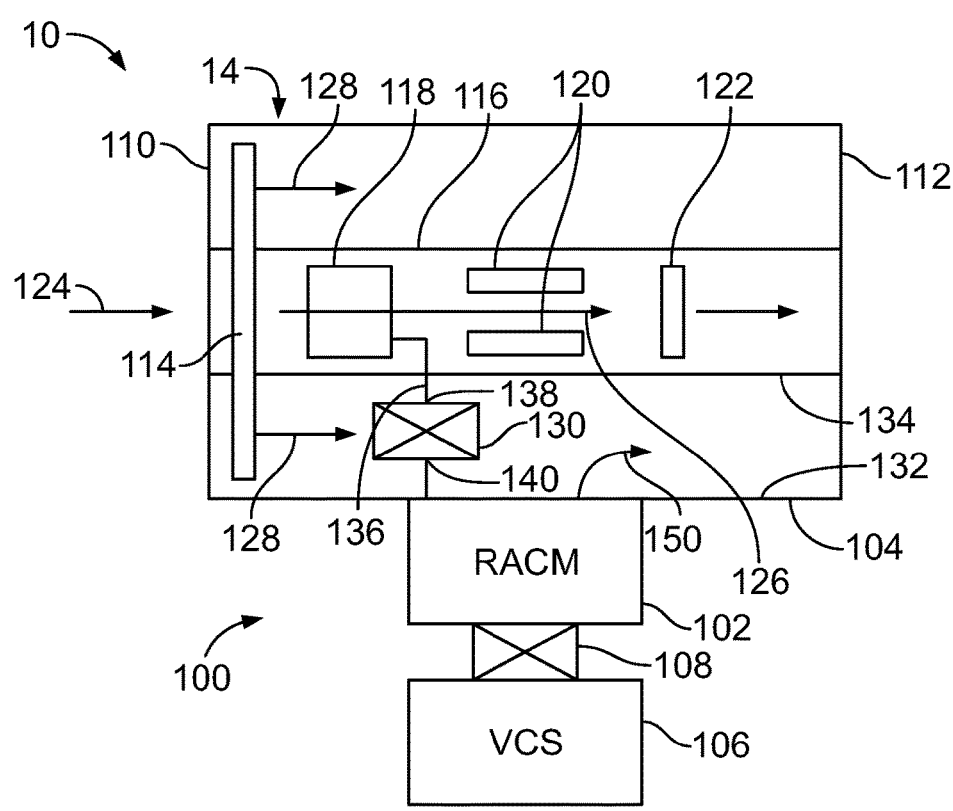
FIG. 2 illustrates a simplified block diagram of a thermal management system of an aircraft, according to an embodiment of the present disclosure.

FIG. 2 illustrates a simplified block diagram of a thermal management system 100 of an aircraft 10, according to an embodiment of the present disclosure. The thermal management system 100 includes at least one reverse air cycle machine (RACM) mounted directly to an engine 14 of the aircraft 10. In at least one embodiment, a RACM or RACM unit 102 is mounted to a side of an outer surface of an engine case 104 of the engine 14. The RACM 102 is coupled to a vapor cycle system (VCS) 106. For example, a first heat exchanger or VCS refrigerant condenser 108 couples the RACM 102 to the VCS 106.

The engine 14 includes the engine case 104 onto which the RACM 102 is mounted. The engine 14 further includes an air inlet 110 at a front end, and an air outlet 112 at a rear end. An engine fan 114 is located proximate to the air inlet 110. An engine core 116 is disposed within the engine case 104 behind the engine fan 114. The engine core 116 includes an engine compressor 118 upstream from one or more combustors 120, which are, in turn, upstream from a turbine 122.

During operation of the aircraft 10, ram air 124 enters the air inlet 110 and passes through the engine fan 114. The ram air 124 that passes through the engine core 116 provides a core air stream 126. The core air stream 126 passes through the engine fan 114, the compressor 118, the combustors 120, and the turbine 122. A portion of the ram air 124 passes through the engine fan 114, but passes around the engine core 116, as an air stream 128 bypassing the engine core 116 (fan bypass air stream 128). The fan bypass air stream 128 may be a single stream of air or divided into fan air and third stream air. Fan air passes through multiple fan stages, such as additional fan stages downstream from the engine fan 114, and bypasses the engine core 116. Third stream air passes through fewer fan stages than the fan air, and bypasses the engine core 116 and the fan air stream. For example, third stream air may only pass through the engine fan 114, but not other fan stages downstream from the initial engine fan 114. In at least one embodiment, the engine 14 may only be configured to operate with respect to core air stream 126, and a fan bypass air stream 128 that does not include a third air stream.

A bypass heat exchanger 130 is secured within the engine 14 outside of the engine core 116. In at least one embodiment, the bypass heat exchanger 130 is disposed between an inner surface 132 of the engine case 104 and an outer surface 134 of the engine core 116. The bypass heat exchanger 130 is within the path of the fan bypass air stream 128 within the engine 14. For example, the bypass heat exchanger 130 may be within an air path of second stream air or third stream air.

A bleed air conduit 136, such as one or more pipes, tubes, plenums, hoses, and/or the like, fluidly couples the compressor 118 to an inlet 138 of the bypass heat exchanger 130. An outlet 140 of the bypass heat exchanger 130 is fluidly coupled to the RACM 102.

In operation, the ram air 124 passes into the air inlet 110 of the engine, and through the engine fan 114. The core air stream 126 passes through the compressor 118. The bleed air conduit 136 redirects a portion of compressed bleed air from the compressor 118 to the bypass heat exchanger 130. The fan bypass air stream 128 passes through the heat exchanger 130 and absorbs heat from the compressed bleed air, thereby reducing the temperature of the compressed bleed air. The reduced temperature compressed bleed air then passes into the RACM 102, which expands and cools the bleed air. The expanded, cooled air passes into the VCS refrigerant condenser 108, where the expanded, cooled air absorbs heat from VCS refrigerant. The VCS refrigerant in the VCS 106 may pass into the VCS refrigerant condenser 108 as a vapor. The expanded, cooled air from the RACM exchanges energy with the VCS refrigerant within the VCS refrigerant condenser 108, thereby condensing the vapor into a liquid.

As such, the RACM 102 coupled to the VCS refrigerant condenser 108 provides a heat sink for the VCS 106. The energy absorbed by the expanded, cooled air of the RACM 102 from the fluid of the VCS 106 increases the temperature of the air. The RACM 102 then compresses the air and reintroduces the air back into the bypass air stream 128 as reintroduced air 150. By reintroducing the reintroduced air 150 back into the bypass air stream 128, the RACM 102 recovers engine thrust, and eliminates, minimizes, or otherwise reduces a thrust penalty associated with extracting air off the engine 14. In at least one embodiment, multiple RACMs 102 are mounted to the engine 14. The engine mounted RACM 102 provides a low temperature and reduced thrust penalty heat sink for the VCS 106 of the aircraft 10.

Figure 3:
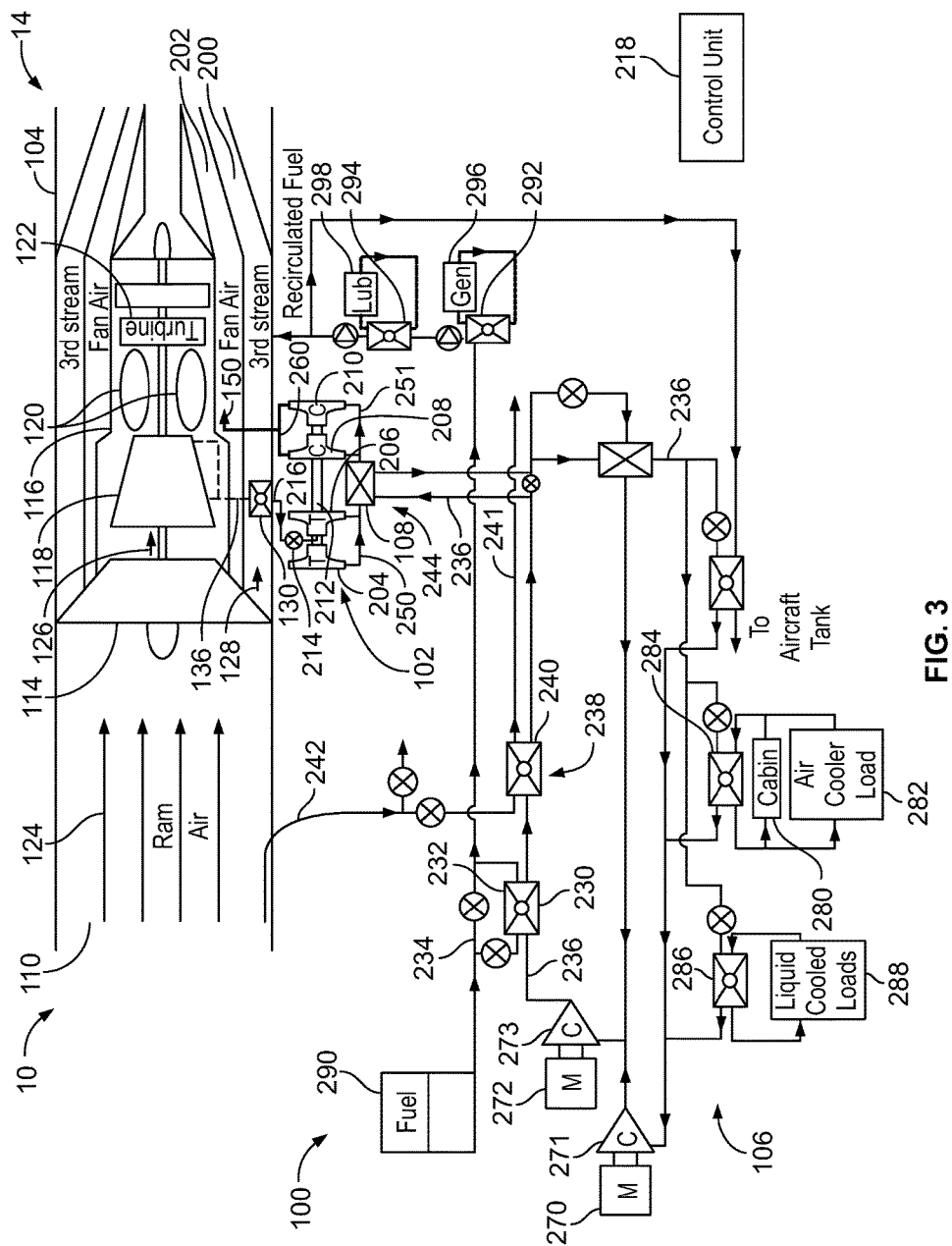
FIG. 3 illustrates a schematic view of a thermal management system of an aircraft, according to an embodiment of the present disclosure.

FIG. 3 illustrates a schematic view of the thermal management system 100 of the aircraft 10, according to an embodiment of the present disclosure. As shown, the bypass heat exchanger 130 is secured within the engine 14, such as within a third air stream flow path 200. In at least one other embodiment, the bypass heat exchanger 130 is secured within a second stream flow path 202, such as a fan air flow path.

The RACM 102 is mounted to the engine case 104, as indicated above. As shown in FIG. 3, the RACM 102 is a double flow RACM. The RACM 102 is a four wheel RACM including two turbines 204 and 206 coupled to two compressors 208 and 210 via a common shaft 212. Alternatively, the RACM 102 may include a single, larger turbine and a single, larger compressor (for example, a single flow RACM). However, by using two smaller turbines 204 and 206 and two smaller compressors 208 and 210, an overall size (e.g., an overall diameter) and weight of the RACM 102 is reduced. Also, alternatively, a motor may be coupled to the shaft 212 in order to assist in operation of the turbines 204 and 206, and the compressors 208 and 210.

The compressed bleed air from the compressor 118 passes into the turbines 204 and 206 via the conduit 216 and powers the turbines 204 and 206. That is, the flow of the compressed bleed air through the turbines 204 and 206 causes the turbines 204 and 206 to move, which causes the shaft 212 to rotate, and therefore also power the compressors 208 and 210. Alternatively, a motor may be used to assist movement of the turbines 204 and 206 and the compressors 208 and 210.

A valve 214 may be disposed within a conduit 216 (such as one or more pipes, tubes, hoses, and/or the like) that fluidly couples the bypass heat exchanger 130 to the RACM 102. In at least one embodiment, a control unit 218 is in communication with the valve 214 (such as through one or more wired or wireless connections) and is configured to operate the valve 214 between open and closed positions. When the valve 214 is in the open position, bleed air (conditioned by the bypass heat exchanger 130) passes into the RACM 102 and is expanded and cooled by the turbines 204 and 206. When the valve 214 is in the closed position, conditioned bleed air is prevented from passing into the RACM 102. The control unit 218 may close the valve 212, such as when the aircraft 10 is not in flight, for example. In at least one other embodiment, the conduit 216 may not include the valve 214.

As shown, three separate and distinct heat sinks may be coupled to the VCS 106. A first heat sink 230 includes a heat exchanger, such as refrigerant condenser 232, coupled to a fuel line 234 and a refrigerant line 236 of the VCS 106. A second heat sink 238 includes a heat exchanger, such as a condenser 240, coupled to a ram air conduit 242 and the refrigerant line 236. The ram air conduit 242 shunts a portion of the ram air 124 towards the condenser 240 before the ram air 124 passes into the engine fan 114. The ram air then passes through the condenser 240 and may be channeled through a conduit 241 to ventilate an engine bay, for example. A third heat sink 244 includes the VCS refrigerant condenser 108 coupled to the RACM 102 and the refrigerant line 236 of the VCS 106. Optionally, the VCS 106 may be coupled to only the third heat sink 244. In at least one other embodiment, the VCS 106 may be coupled to the third heat sink 244 and one of the first heat sink 230 or the second heat sink 238. It is to be understood that the terms first, second, and third merely indicate the number of heat sinks. The first heat sink 230 may be considered the second or third heat sink, the second heat sink 238 may be considered the first or third heat sink, and third heat sink 244 may be considered the first or second heat sink.

In at least one embodiment, the control unit 218 is in communication with various valves within the heat management system 100 through one or more wired or wireless connections. The control unit 218 is configured to selectively operate the valves between open and closed positions, depending on a desired level of heat management and air vehicle flight condition.

As indicated above with respect to FIG. 2, the ram air 124 passes into the air inlet 110 of the engine 14, and through the engine fan 114. The core air stream 126 passes through the compressor 118. The bleed air conduit 136 redirects a portion of compressed bleed air from the compressor 118 into the bypass heat exchanger 130. The fan bypass air 128 passes through the heat exchanger 130 and absorbs heat from the compressed bleed air, thereby reducing the temperature of the compressed bleed air. The reduced temperature compressed bleed air then passes into the RACM 102, which expands and cools the bleed air via the turbines 204 and 206. The expanded, cooled air passes into the VCS refrigerant condenser 108 via a conduit 250, where the expanded, cooled air absorbs heat from a fluid refrigerant circulating through the line 236 of the VCS 106. The fluid from the VCS 106 passes from the VCS 106 into the VCS refrigerant condenser 108 as a combination of liquid and vapor. The expanded, cooled air from the RACM 102 exchanges energy with the fluid from the VCS 106 within the VCS refrigerant condenser 108, thereby condensing the remaining vapor into a liquid, which is then recirculated back into the VCS 106. In this manner, the heat sink 244 (as represented by the refrigerant condenser 108 that couples the RACM 102 to the VCS 106) conditions the refrigerant circulating through the line 236 of the VCS 106, thereby allowing the refrigerant to absorb heat from one or more systems, components, areas, and/or the like of the aircraft 10. The first heat sink 230 and the second heat sink 238 also condense refrigerant circulating through the line 236.

The energy absorbed by the expanded, cooled air of the RACM 102 from the refrigerant of the VCS 106 increases the temperature of the RACM heat sink air. The RACM 102 then compresses the RACM heat sink air via the compressors 208 and 210, and injects it back into the engine fan air stream 150 through an injection conduit 260.

The VCS 106 is configured to provide vapor-compression refrigeration, in which a refrigerant undergoes phase changes to condition an internal cabin and/or electronic systems of the aircraft 10. The VCS 106 circulates the refrigerant therethrough to cool portions of the aircraft 10 through heat exchange. The refrigerant provides a fluid that circulates through the VCS 106 that changes phases (for example, from liquid to vapor), in order to absorb heat from an internal cabin and/or components (for example, avionics) of the aircraft 10.

The VCS 106 may include a first stage motor 270 and compressor 271 and a second stage motor 272 and compressor 273. The second stage compressor 273 is coupled to the line 236 that is, in turn, coupled to the first heat sink 230, the second heat sink 238, and the third heat sink 244. The refrigerant that is condensed through one or more of the heat sinks 230, 238, and 244 is then split with one stream passing through a first throttling valve while the other stream passes through a refrigerant subcooler 278. The refrigerant from the throttling valve next passes through the subcooler before combining with refrigerant from the first stage compressor 271. The other refrigerant stream is sent through a throttling valve and then is sent through the refrigerant line 236 to absorb heat from a cabin 280 and air cooled loads 282 (such as including one or more electronic systems of the aircraft 10 that are cooled through air circulation) within the aircraft 10 via a refrigerant evaporator 284. The refrigerant line 236 may also couple to another throttling valve and a refrigerant evaporator 286 to absorb heat from liquid cooled loads 288 (such as including one or more electronic systems of the aircraft 10 that are cooled through liquid circulation).

As shown, one or more valves may be disposed within the various conduits of the VCS 106. The valves may be selectively controlled by the control unit 218 to provide a desired amount of fluid (for example, refrigerant or other such coolant) flow through the VCS 106.

The VCS 106 may include more or less components than shown. For example, the VCS may include less than two motors 270 and 272 and/or less than two compressors 271 and 273. Further, the refrigerant line 236 may be coupled to more or less loads than shown. For example, the refrigerant line 236 may be configured to condition only the cabin 282, or the air cooled load 282, or the liquid cooled load 288.

The fuel line 234 provides a fuel delivery conduit between a fuel tank 290 and the engine 14. The refrigerant condenser 232 couples the fuel line 234 to the refrigerant line 236 of the VCS 106. As such, the refrigerant condenser 232 transfers heat energy from the refrigerant in the line 236 to the fuel within the fuel line 234, thereby increasing the temperature of the fuel, and decreasing the temperature of the refrigerant.

The fuel line 234 may then pass through heat exchangers 292 and 294 of an engine generator 294 and an engine lubrication system 298. Heat energy is transferred from the generator 294 and the lubrication system 298 to fuel within the fuel line 234 by way of the heat exchangers 292 and 294, thereby increasing the temperature of the fuel, and decreasing the temperature of the generator 296 and the lubrication system 298. The fuel is then delivered to the engine through the fuel line 234. If the temperature of the fuel is above the engine maximum delivery temperature after taking on these thermal loads, then the fuel flow rate is increased above the burn fuel flow rate to reduce the temperature to the engine delivery limit. The difference between this increased fuel flow rate and the engine burn fuel flow rate is recirculated back to the air vehicle fuel tank. The recirculated fuel is cooled prior returning to the tank in the evaporator 286 that follows s throttling valve in the VCS 106.

Alternatively, the fuel line 234 may not be coupled to the generator 296 and the lubrication system 298 through the heat exchangers 292 and 294. Instead, fuel within the fuel line 234 may receive heat energy from the VCS 106 by way of the refrigerant condenser 232, and then pass directly to the engine 14.

In at least one embodiment, the control unit 218 operates to selectively control flow of fluids (such as air and refrigerant) through the thermal management system 100 via the valves. For example, the control unit 218 may selectively open and close the valves to control a temperature of the fluids (whether gas, vapor, or liquid) through the various conduits, in order to control temperatures of the cabin 280, the air cooled load 282, and the liquid cooled loads 288. In at least one embodiment, the systems described in the present application may not include the control unit 218.

As used herein, the term "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 218 may be or include one or more processors that are configured to control operation of the thermal management system 100.

The control unit 218 is configured to execute a et of instructions that are stored in one or more storage elements (such as one or more memories), in order to process data. For example, the control unit 218 may include or be coupled to one or more memories. The storage elements may also store data or other information as desired or needed. The storage elements may be in the form of an information source or a physical memory element within a processing machine.

The set of instructions may include various commands that instruct the control unit 218 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the control unit 218. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 218 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 4:
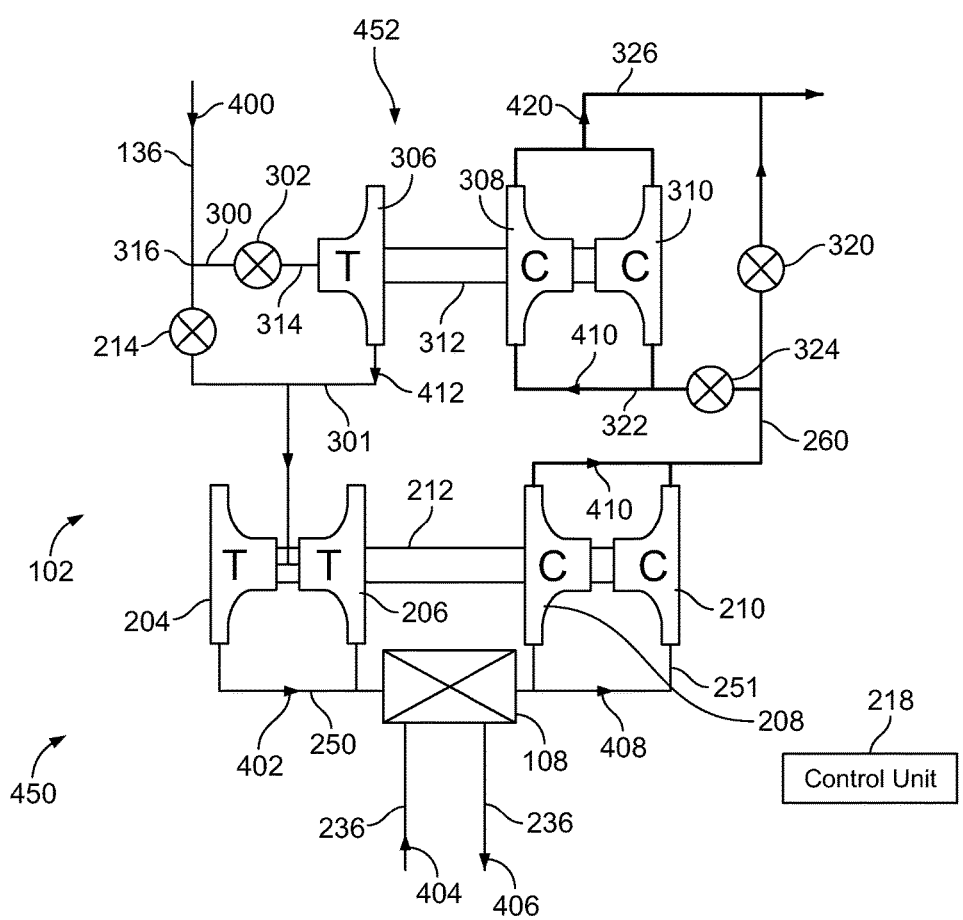
FIG. 4 illustrates a schematic view of reverse air cycle machine (RACM), according to an embodiment of the present disclosure.

FIG. 4 illustrates a schematic view of reverse air cycle machine (RACM) 102, according to an embodiment of the present disclosure. Referring to FIGS. 2-4, the RACM 102 is coupled to the bypass heat exchanger 130 within the engine 14, and the VCS refrigerant condenser 108 that couples to the refrigerant line 236 of the VCS 106. In at least one embodiment, the cascaded RACM unit 102 includes a low pressure four wheel RACM 450 connected to a high pressure three wheel RACM 452. Alternatively, the high pressure RACM 452 may be a four wheel RACM including two turbines.

The RACM 102 includes a branching conduit 300 that branches off from the bleed air conduit 136. A valve 302 is disposed within the branching conduit 300. In at least one embodiment, the control unit 218 is in communication with the valve 302 through one or more wired or wireless connections. A turbine 306 is coupled to compressors 308 and 310 via a common shaft 312 forming the high pressure RACM. The turbine 306 is are disposed downstream from an outlet end 314 of the branching conduit 300.

The valve 214 is disposed within the bleed air conduit 136 downstream from a junction 316 of the bleed air conduit 136 and the branching conduit 300. The bleed air conduit 136 couples to the turbines 204 and 206, which connect to the shaft 212 that also connects to the compressors 208 and 210 forming the low pressure RACM. The turbines 204 and 206 are fluidly coupled to the conduit 250, which fluidly couples to the VCS refrigerant condenser 108, which is also coupled to the refrigerant line 236. The VCS refrigerant condenser 108 also couples to the compressors 208 and 210 via a conduit 251. The compressors 208 and 210 are fluidly coupled to the engine injection conduit 260. A valve 320 is disposed within the engine injection conduit 260.

A branching conduit 322 branches off from the engine injection conduit 260 upstream from the valve 320. A valve 324 is disposed within the branching conduit 322. The valves 214, 302, 320, and 324 may be in communication with the control unit 218 through one or more wired or wireless connections.

The branching conduit 322 is coupled to the compressors 308 and 310. The branching conduit 322 provides an air inlet conduit to the compressors 308 and 310. An air outlet conduit 326 is downstream from the compressors 308 and 310 and reconnects to the engine injection conduit 260 downstream from the valve 320.

As shown in FIG. 4, the double flow cascaded RACM 102 is mounted to the engine 14, which is shown in FIGS. 2 and 3. In operation, the valves 216, 302, 324, and 320 are opened or closed depending on an air speed of the aircraft (shown in FIG. 1). For example, in at least one embodiment, the control unit 218 selectively controls the valves 214, 302, 324, and 320 depending on the air speed of the aircraft 10.

Referring to FIGS. 2-4, during a subsonic cruise of the aircraft 10, the valves 302 and 324 are closed, and the valves 214 and 320 are opened. The high pressure RACM is bypassed and bleed air 400 drawn from the compressor 118 is prevented from passing through the branching conduit 300 towards the single turbine 306. Instead, the bleed air 400 passes through the open valve 214 in the bleed air conduit 136 into the low pressure RACM, and is expanded and cooled by the turbines 204 and 206. The expanded, cooled bleed air 402 then passes through the heat VCS refrigerant condenser 108, where the cooled bleed air absorbs heat energy from refrigerant 404 within the refrigerant line 236, thereby lowering the temperature and condensing the refrigerant 406 that passes out of the VCS refrigerant condenser 108 and is circulated through the VCS 106 via the refrigerant line 236.

Because the expanded, cooled bleed air 402 absorbs heat energy from the refrigerant 404, the bleed air passes into the conduit 251 as expanded bleed air 408 at an elevated temperature. The expanded bleed air 408 then passes through the compressors 208 and 210, and exits the compressors 208 and 210 as compressed engine injection air 410. Because the valve 324 is closed, the engine injection air 410 does not pass through the branching conduit 322, but, instead, passes through the open valve 320 and back into the engine 14 via the engine injection conduit 260. Thrust is recovered from the engine injection air 410 when it is injected into the fan air stream 128.

When the aircraft 10 is being flown at supersonic airspeeds, the temperature of the compressed bleed air 400 may be too high to absorb heat from the refrigerant, even after passing through the turbines 204 and 206. As such, the valve may be operated (such as through the control unit 218) so that the compressed bleed air 400 first passes through the turbine 306 before passing through the turbines 204 and 206. During such operation, the valves 302 and 324 are opened, while the valves 214 and 320 are closed. The compressed bleed air 400 first passes through the open valve 302 of the branching conduit 300 and into the turbine 306, which expands and cools the compressed bleed air 400. The initially expanded, cooled air 412 passes back into the bleed air conduit 136 downstream from the closed valve 214 via a connecting conduit 301 that connects an outlet of the turbine 306 to the bleed air conduit 136. The air 412 then passes through the turbines 204 and 206, which further expand and cool the initially expanded, cooled air 412, to yield further expanded and cooled air 402, which then passes through the VCS refrigerant condenser 108, as previously described.

After passing through the VCS refrigerant condenser 108, the temperature of expanded bleed air is increased (due to absorbing heat energy from the refrigerant). The expanded bleed air 408 passes out of the VCS refrigerant condenser 108 and then passes through the compressors 208 and 210, yielding the compressed engine injection air 410. Because the valve 320 is closed, the compressed engine injection air 410 passes through the compressors 308 and 310, which further compress the engine injection air 410, thereby yielding further compressed engine injection air 420. The air 420 next passes into the engine injection conduit 260 downstream from the closed valve 320 via a connecting conduit 326 that connects an output of the compressors 308 and 310 to the engine injection conduit 260.

Figure 5:
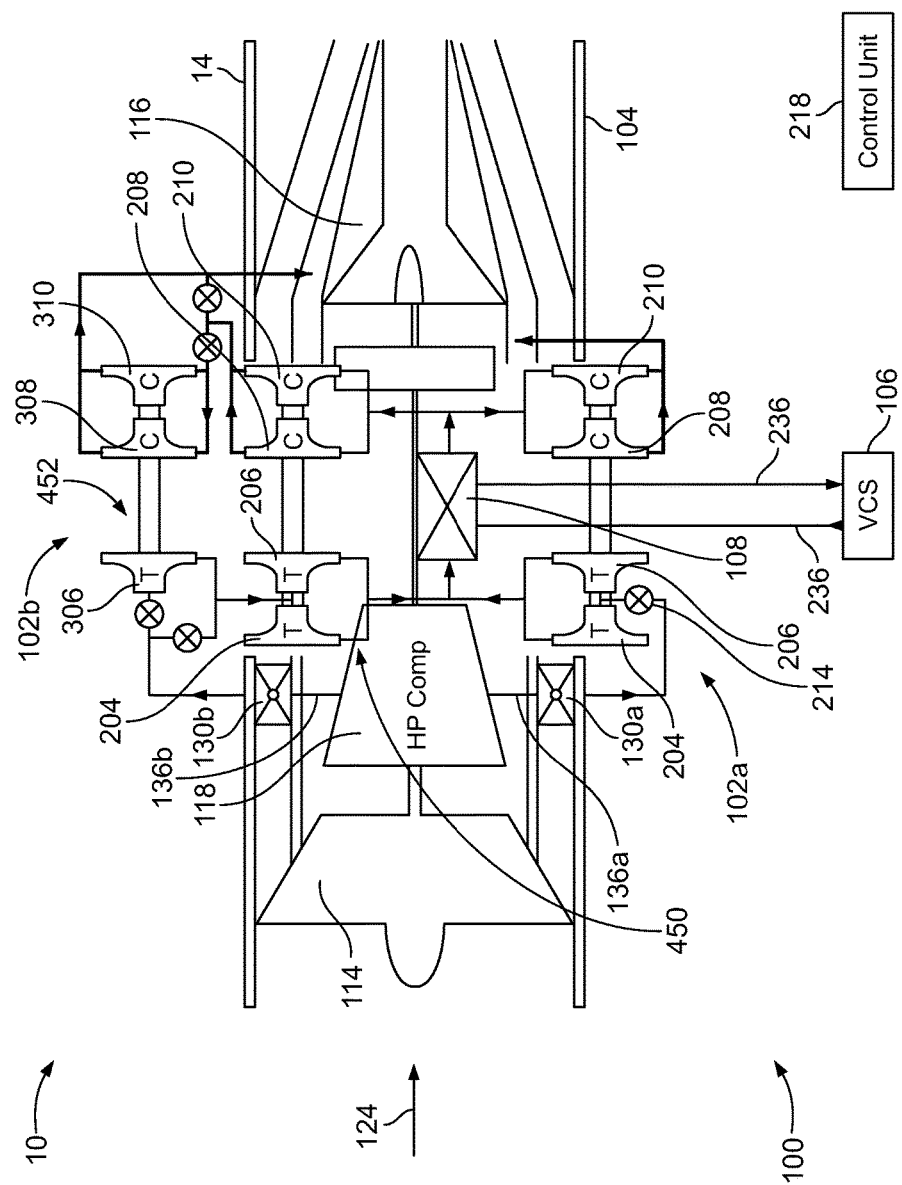
FIG. 5 illustrates a schematic view of a thermal management system of an aircraft, according to an embodiment of the present disclosure.

FIG. 5 illustrates a schematic view of the thermal management system 100 of the aircraft 10, according to an embodiment of the present disclosure. The thermal management system 100 includes a first RACM 102a and a second cascaded RACM 102b mounted to the engine case 104 of the engine 14. The first RACM 102a is similar to the RACM 102 shown and described with respect to FIG. 3, while the second cascaded RACM 102b is similar to the cascaded RACM 102 shown and described with respect to FIG. 4.

A first bleed air conduit 136 connects the compressor 118 to the first RACM 102a, while a second bleed air conduit 136b connects the compressor to the second RACM 102b. During subsonic flight, the valves of the thermal management system 100 are set (such as by the control unit 218) so that a portion of compressed bleed air is directed to both the RACMs 102a and 102b. Bypass heat exchangers 130a and 130b are disposed within bypass airstreams of the engine 104. During subsonic flight, the valves of the second RACM 102b are set (such as by the control unit 218) so that compressed bleed air passes into the turbines 204 and 206, instead of the turbine 306, as described above with respect to FIG. 4. The turbines 204 and 208 of both the RACMs 102a and 102b are coupled to the VCS refrigerant condenser 108, while the compressors 208 and 210 of both the RACMs 102 and 102b are also coupled to the VCS refrigerant condenser 108.

During supersonic flight, the valves of the second RACM 102b are set (such as by the control unit 218) so that the compressed bleed air passes into the turbine 306 before passing into the turbines 204 and 206, as described above with respect to FIG. 4. Further, during supersonic flight, the compressed bleed air passes through the compressors 208, 210, 308, 310 before being reintroduced back into the engine 14, as described above with respect to FIG. 4. Optionally, during supersonic flight, the valve 214 may be closed to prevent compressed bleed air from passing through the first RACM 102a.

Optionally, the first RACM 102a may also be a cascade RAM that includes a turbine 306, and compressors 308 and 310, similar to the second RACM 102b. In this case, the first RACM 102a would operate in the same way as the second RACM 102b during subsonic and supersonic flight.

In at least one embodiment, the thermal management system 100 addresses cooling requirements during operation of the aircraft by controlling the RACM configuration and routing of air flow. To meet ground idle cooling requirements, the thermal management system 100 uses engine burn fuel and ram air, but not the RACMs 102 and 102b because the engine bleed air pressure is not high enough to drive them. During sub-sonic flight, the thermal management system 100 uses the engine burn fuel, ram air, and one or both of the RACM 102a and cascaded RACM 102b as heat sinks. The cascaded RACM 102b may or may not use both RACMs depending on the flight environment and demanded load. To meet super-sonic cruise cooling requirements, the thermal management system does not use any ram air as a heat sink because it is too hot, but instead uses engine burn fuel, the RACM 102a, and the cascaded RACM 102b with both RACMs in the cascaded RACM 102b in operation.

Referring to FIGS. 1-5, the thermal management system 100 includes one or more engine-mounted RACMs 102 that are configured to convert engine bleed air into a heat sink for the VCS 106. The bleed air is first cooled via the heat exchanger(s) 130 located within the engine 14 in a fan bypass air stream 128 (such as a second air stream or a third air stream). The RACM(s) 102 reintroduces the bleed air back into the engine 14 to recover thrust.

Alternatively, the thermal management system 100 may include more or less RACMs 102 and VCS 106 than shown. For example, the thermal management system 100 may include three or more RACMs 102 and three or more VCS 106. In at least one other embodiment, the thermal management system 100 may include two or more RACMs 102 and one VCS 106. In at least one other embodiment, the thermal management system 100 may include two or more VCS units 106 and one RACM 102.

Figure 6:
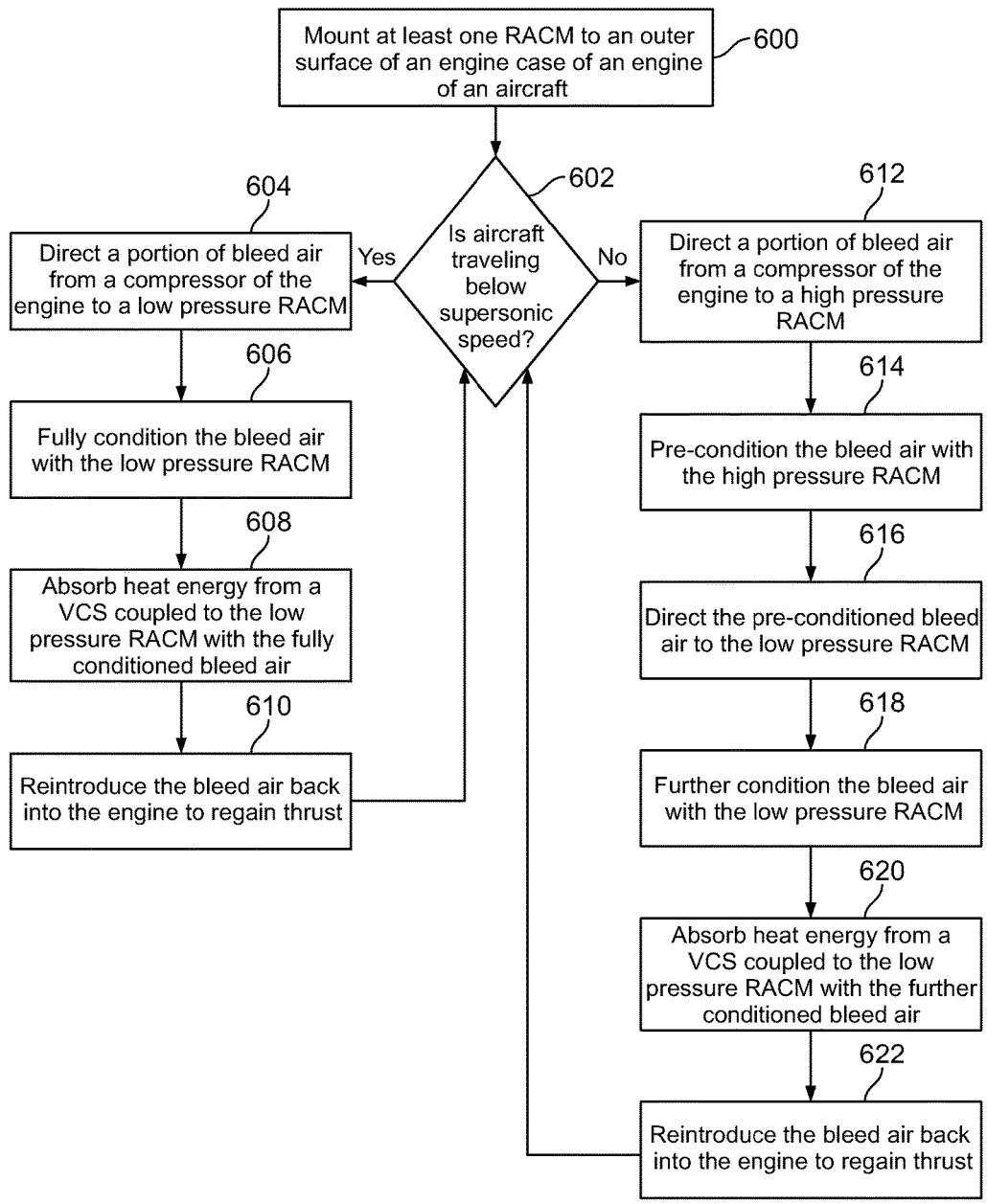
FIG. 6 illustrates a flow chart of a method of operating a heat management system, according to an embodiment of the present disclosure.

FIG. 6 illustrates a flow chart of a method of operating the heat management system 100, according to an embodiment of the present disclosure. Referring to FIGS. 1-6, the method begins at 600, in which at least one RACM 102 is mounted to an outer surface of the engine case 104 of the engine 14 of the aircraft 10. For example, a first RACM 102a and a second RACM 102b may be mounted to the engine 14.

At 602, the control unit 218 determines whether the aircraft 10 is traveling below supersonic speed. That is, the control unit 218 determines whether the air speed of the aircraft 10 is subsonic or supersonic. If the aircraft 10 is traveling below supersonic speed, the method proceeds from 602 to 604, at which the control unit 218 operates valves of the thermal management system 100 so that a portion of bleed air from the compressor 118 of the engine 14 is directed through the heat exchanger 130 within the engine 14 to a first or low pressure RACM 450 (such as a four wheel RACM having two turbines and two compressors). At 606, the low pressure RACM 450 then fully conditions the bleed air. At 608, heat energy from the VCS 106 is absorbed with the fully-conditioned bleed air from the low pressure RACM 450. At 610, after passing through the low pressure RACM, the bleed air is reintroduced back into an airstream of the engine 14 to regain thrust. The method then returns to 602.

If, however, the control unit 218 determines that the aircraft 10 is not traveling below supersonic speed (that is, the aircraft 10 is traveling at a supersonic speed) at 602, the method proceeds to 612, in which a portion of bleed air from the compressor 118 is directed to the second or high pressure RACM 452. At 614, the high pressure RACM pre-conditions the bleed air. At 616, the pre-conditioned bleed air is then directed to the low pressure RACM 450, which further conditions the bleed air. At 620, heat energy from the VCS 106 is absorbed with the further-conditioned bleed air from the low pressure RACM 450. At 622, after passing through the low pressure RACM 450 and the high pressure RACM 452, the bleed air is reintroduced back into an airstream of the engine 14 to regain thrust. The method then returns to 602.

Referring to FIGS. 1-6, embodiments of the present disclosure provide thermal management systems that are configured to efficiently cool the cabin and avionics of an aircraft by transferring heat from the refrigerant within at least one VCS to engine bleed air, which has passed through at least one RACM mounted to an engine of the vehicle. The thermal management systems may also transfer heat from the refrigerant within the one or more VCS to fuel within a fuel line of the vehicle and/or a ram air conduit.

The thermal management systems reintroduce bleed air that passes through at least one RACM and used to absorb heat energy from fluid of the VCS back into the engine to regain thrust. That is, in order to eliminate, minimize, or otherwise reduce a drag penalty associated with extracting air off the engine, the RACM reintroduces the air back into the engine, such as at a point upstream of the engine fan. In at least one embodiment, multiple RACMs are mounted to the engine. The engine mounted RACM provides a compact, low temperature, low thrust penalty heat sink for a TMS of an aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A thermal management system that is configured to cool portions of an aircraft, the thermal management system comprising:
 at least one reverse air cycle machine (RACM) mounted on an engine of the aircraft, wherein the at least one RACM receives compressed bleed air from an engine compressor and cools and expands the bleed air;
 a vapor cycle system (VCS) that is configured to circulate a refrigerant; and
 a condenser that couples the at least one RACM to the VCS, wherein the at least one RACM coupled to the VCS through the condenser provides a first heat sink for the VCS, wherein the cooled and expanded bleed air is directed to the condenser where the expanded bleed air absorbs heat energy from the refrigerant that circulates through the VCS.

2. The thermal management system of claim 1, wherein the at least one RACM reintroduces the bleed air back into the engine after the bleed air passes through the at least one RACM to regain thrust.

3. The thermal management system of claim 1, wherein the engine further comprises a bypass heat exchanger within an engine case that is outside of an engine core, wherein the at least one RACM is coupled to the engine compressor through the bypass heat exchanger, wherein the bypass heat exchanger is disposed within a bypass air stream outside of the engine core, and wherein the bypass heat exchanger cools the compressed bleed air from the engine compressor before the compressed bleed air is directed to the at least one RACM.

4. The thermal management system of claim 3, wherein the bypass heat exchanger is disposed within one or both of a second air stream or a third stream outside of a first air stream that passes through the engine core.

5. The thermal management system of claim 1, wherein the at least one RACM comprises one or more turbines that are configured to expand and cool the compressed bleed air from the engine compressor.

6. The thermal management system of claim 1, wherein the at least one RACM comprises one or more compressors that are configured to compress the bleed air after the bleed air passes through the condenser.

7. The thermal management system of claim 1, wherein the at least one RACM comprises a first turbine, a second turbine, a first compressor, and a second compressor, wherein the first turbine, the second turbine, the first compressor, and the second compressor are coupled to a common shaft.

8. The thermal management system of claim 1, further comprising:
a second heat exchanger coupled to a fuel line and the VCS, wherein the second heat exchanger coupled to the fuel line provides a second heat sink for the VCS; and
a third heat exchanger coupled to a ram air bypass conduit and the VCS, wherein the third heat exchanger coupled to the ram air bypass conduit provides a third heat sink for the VCS.

9. The thermal management system of claim 1, wherein the at least one RACM comprises a low pressure RACM coupled to a high pressure RACM.

10. The thermal management system of claim 9, further comprising a control unit operatively coupled to the low pressure RACM and the high pressure RACM, wherein the control unit is configured to direct compressed bleed air from an engine compressor through only the low pressure RACM when an airspeed of the aircraft is subsonic, and wherein the control unit is configured to direct the compressed bleed air from the engine compressor through the high pressure RACM before the low pressure RACM when the airspeed of the aircraft is supersonic.

11. The thermal management system of claim 10, wherein the control unit is in communication with a plurality of valves that are selectively controlled to selectively direct the compressed bleed air through the low pressure RACM and the high pressure RACM.

12. The thermal management system of claim 9, wherein the low pressure RACM comprises a first turbine and a second turbine coupled to a first compressor and a second compressor through a first shaft, and wherein the high pressure RACM comprises a third turbine coupled to a third compressor and a fourth compressor through a second shaft.

13. The thermal management system of claim 1, wherein the at least one RACM comprises a first RACM mounted on the engine and a second RACM mounted on the engine.

14. The thermal management system of claim 13, wherein one or both of the first RACM or the second RACM comprises a low pressure RACM coupled to a high pressure RACM.

15. A method of cooling portions of an aircraft, the method comprising:
mounting at least one reverse air cycle machine (RACM) on an engine of the aircraft;
using a vapor cycle system (VCS) to circulate a refrigerant;
coupling the at least one RACM to the VCS through a condenser;
providing a first heat sink for the VCS through the coupling the at least one RACM to the VCS;
receiving compressed bleed air from an engine compressor at the at least one RACM;
cooling and expanding the compressed bleed air using the at least one RACM;
directing the cooled and expanded bleed air to the condenser where the expanded bleed air absorbs heat energy from the fluid that circulates through the VCS.

16. The method of claim 15, further comprising using the at least one RACM to reintroduce the bleed air back into the engine after the bleed air passes through the at least one RACM to regain thrust.

17. The method of claim 15, further comprising:
disposing a bypass heat exchanger within an engine case that is outside of an engine core;
coupling the at least one RACM to the engine compressor through the bypass heat exchanger, wherein the bypass heat exchanger is disposed within a bypass air stream outside of the engine core; and
cooling the compressed bleed air with the bypass heat exchanger before the compressed bleed air is directed to the at least one RACM.

18. The method of claim 15, further comprising:
coupling a second heat exchanger to a fuel line and the VCS to provide a second heat sink for the VCS; and
coupling a third heat exchanger coupled to a ram air bypass conduit and the VCS to provide a third heat sink for the VCS.

19. The method of claim 15, further comprising:
operatively coupling a control unit to a low pressure RACM and a high pressure RACM of the at least one RACM;
using the control unit to direct the compressed bleed air from the engine compressor through only the low pressure RACM when an airspeed of the aircraft is subsonic; and
using the control unit to direct the compressed bleed air from the engine compressor through the high pressure RACM before the low pressure RACM when the airspeed of the aircraft is supersonic.

20. An aircraft comprising:
a fuselage defining an internal cabin;
wings extending from the fuselage;
an engine carried by the fuselage, wherein the engine comprises an engine case containing an engine fan, an engine core including an engine compressor, and a bypass heat exchanger within the engine case that is outside of the engine core, wherein the bypass heat exchanger is disposed within a bypass air stream outside of the engine core; and a thermal management system that is configured to cool portions of the aircraft, the thermal management system comprising:
  at least one reverse air cycle machine (RACM) mounted on the engine, wherein the at least one RACM is coupled to the engine compressor through the bypass heat exchanger, wherein the bypass heat exchanger cools compressed bleed air from the engine compressor before the compressed air is directed to the at least one RACM, wherein the at least one RACM comprises one or more turbines that are configured to expand and cool the compressed bleed air from the compressor, and one or more compressors that are configured to compress the bleed air;
  a vapor cycle system (VCS) that is configured to circulate a refrigerant; and
  a condenser that couples the at least one RACM to the VCS, wherein the at least one RACM coupled to the VCS through the condenser provides a first heat sink for the VCS,
  wherein the at least one RACM receives the compressed bleed air from the engine compressor and cools and expands the bleed air, and wherein the cooled and expanded bleed air is directed to the condenser where the expanded bleed air absorbs heat energy from the fluid that circulates through the VCS, and
  wherein the at least one RACM reintroduces the bleed air back into the engine after the bleed air passes through the at least one RACM to regain thrust.

21. The aircraft of claim 20, wherein the at least one RACM comprises a low pressure RACM coupled to a high pressure RACM, and wherein the thermal management system further comprises a control unit operatively coupled to the low pressure RACM and the high pressure RACM, wherein the control unit is configured to direct the compressed bleed air from the engine compressor through only the low pressure RACM when an airspeed of the aircraft is subsonic, and wherein the control unit is configured to direct the compressed bleed air from the engine compressor through the high pressure RACM before the low pressure RACM when the airspeed of the aircraft is supersonic.

22. A thermal management system that is configured to cool portions of an aircraft, the thermal management system comprising:
  at least one reverse air cycle machine (RACM) mounted on an engine of the aircraft, wherein the at least one RACM comprises a first turbine, a second turbine, a first compressor, and a second compressor, wherein the first turbine, the second turbine, the first compressor, and the second compressor are coupled to a common shaft;
  a vapor cycle system (VCS) that is configured to circulate a refrigerant; and
  a condenser that couples the at least one RACM to the VCS, wherein the at least one RACM coupled to the VCS through the condenser provides a first heat sink for the VCS.

23. A thermal management system that is configured to cool portions of an aircraft, the thermal management system comprising:
  at least one reverse air cycle machine (RACM) mounted on an engine of the aircraft;
  a vapor cycle system (VCS) that is configured to circulate a refrigerant;
  a first heat exchanger that couples the at least one RACM to the VCS, wherein the at least one RACM coupled to the VCS through the first heat exchanger provides a first heat sink for the VCS;
  a second heat exchanger coupled to a fuel line and the VCS, wherein the second heat exchanger coupled to the fuel line provides a second heat sink for the VCS; and
  a third heat exchanger coupled to a ram air bypass conduit and the VCS, wherein the third heat exchanger coupled to the ram air bypass conduit provides a third heat sink for the VCS.

24. A thermal management system that is configured to cool portions of an aircraft, the thermal management system comprising:
  a low pressure reverse air cycle machine (RACM) coupled to a high pressure RACM mounted on an engine of the aircraft;
  a vapor cycle system (VCS) that is configured to circulate a refrigerant;
  a condenser that couples the low pressure RACM and the high pressure RACM to the VCS, wherein the low pressure RACM and the high pressure RACM coupled to the VCS through the condenser provides a first heat sink for the VCS; and
  a control unit operatively coupled to the low pressure RACM and the high pressure RACM, wherein the control unit is configured to direct compressed bleed air from an engine compressor through only the low pressure RACM when an airspeed of the aircraft is subsonic, and wherein the control unit is configured to direct the compressed bleed air from the engine compressor through the high pressure RACM before the low pressure RACM when the airspeed of the aircraft is supersonic.

25. A method of cooling portions of an aircraft, the method comprising:
  mounting at least one reverse air cycle machine (RACM) on an engine of the aircraft;
  using a vapor cycle system (VCS) to circulate a refrigerant;
  coupling the at least one RACM to the VCS through a first heat exchanger to provide a first heat sink for the VCS;
  coupling a second heat exchanger to a fuel line and the VCS to provide a second heat sink for the VCS; and
  coupling a third heat exchanger coupled to a ram air bypass conduit and the VCS to provide a third heat sink for the VCS.

26. A method of cooling portions of an aircraft, the method comprising:
  mounting a low pressure RACM and a high pressure RACM on an engine of the aircraft;
  using a vapor cycle system (VCS) to circulate a refrigerant;
  coupling the a low pressure RACM and the high pressure RACM to the VCS through a condenser;
  providing a first heat sink for the VCS through the coupling the low pressure RACM and the high pressure RACM to the VCS;
  operatively coupling a control unit to the low pressure RACM and the high pressure RACM;
  using the control unit to direct the compressed bleed air from the engine compressor through only the low pressure RACM when an airspeed of the aircraft is subsonic; and using the control unit to direct the compressed bleed air from the engine compressor through the high pressure RACM before the low pressure RACM when the airspeed of the aircraft is supersonic.

* * * * *